(12) United States Patent
Yamamoto et al.

(10) Patent No.: US 9,688,310 B2
(45) Date of Patent: Jun. 27, 2017

(54) AUTOMOBILE FRONT PILLAR LOWER STRUCTURE

(71) Applicant: TOYOTA JIDOSHA KABUSHIKI KAISHA, Toyota-shi (JP)

(72) Inventors: Youhei Yamamoto, Nagoya (JP); Daisuke Teramoto, Toyota (JP); Nobuaki Kitaura, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/779,143

(22) PCT Filed: Mar. 26, 2013

(86) PCT No.: PCT/JP2013/058842
§ 371 (c)(1),
(2) Date: Sep. 22, 2015

(87) PCT Pub. No.: WO2014/155538
PCT Pub. Date: Oct. 2, 2014

(65) Prior Publication Data
US 2016/0039466 A1 Feb. 11, 2016

(51) Int. Cl.
*B62D 21/15* (2006.01)
*B62D 25/04* (2006.01)
(Continued)

(52) U.S. Cl.
CPC ......... *B62D 21/152* (2013.01); *B62D 25/025* (2013.01); *B62D 25/04* (2013.01); *B62D 27/023* (2013.01)

(58) Field of Classification Search
CPC .. B62D 21/152; B62D 27/023; B62D 25/025; B62D 25/04
(Continued)

(56) References Cited

U.S. PATENT DOCUMENTS

| 2003/0102697 A1 | 6/2003 | Yakata et al. | |
|---|---|---|---|
| 2011/0156446 A1* | 6/2011 | Iwase | B62D 25/025 |
| | | | 296/193.06 |
| 2012/0313400 A1* | 12/2012 | Balzer | B62D 25/04 |
| | | | 296/193.06 |

FOREIGN PATENT DOCUMENTS

| JP | 62 11076 | 1/1987 |
|---|---|---|
| JP | 62 130987 | 8/1987 |

(Continued)

OTHER PUBLICATIONS

International Search Report issued May 7, 2013 in PCT/JP2013/058842 filed Mar. 26, 2013.

*Primary Examiner* — D Glenn Dayoan
*Assistant Examiner* — Dana D Ivey
(74) *Attorney, Agent, or Firm* — Oblon, McClelland, Maier & Neustadt, L.L.P.

(57) ABSTRACT

Deformation of a vehicle compartment is suppressed at the time of a small overlap collision.

A front pillar lower structure (10) includes a gusset (50) joined to a lower end portion of a pillar reinforcement (41). In the gusset (50), a front wall (50B) and a lower wall (50C) extend from a side wall (50A) located on the outer side in a vehicle width direction of a rocker reinforcement. The front wall (50B) covers the rocker reinforcement (29) from the vehicle front side, while the lower wall (50C) extends toward the vehicle rear side from a lower end of the front wall (50B) and is joined to a lower surface of the rocker reinforcement (29). Since the strength of a joint portion (51) between the pillar reinforcement (41) and the rocker reinforcement (29) can be improved by the gusset (50), it is possible to prevent or suppress breakage of the joint portion (51) at the time of a small overlap collision so that deformation of a vehicle compartment (21) due to such breakage can be suppressed.

9 Claims, 16 Drawing Sheets

(51) Int. Cl.
*B62D 25/02* (2006.01)
*B62D 27/02* (2006.01)

(58) Field of Classification Search
USPC ..................................................... 296/193.06
See application file for complete search history.

(56) References Cited

FOREIGN PATENT DOCUMENTS

| | | |
|---|---|---|
| JP | 62 197475 | 12/1987 |
| JP | 4 334665 | 11/1992 |
| JP | 7 89450 | 4/1995 |
| JP | 11-192969 A | 7/1999 |
| JP | 2002 337734 | 11/2002 |
| JP | 2003 127899 | 5/2003 |
| JP | 2011 136593 | 7/2011 |

\* cited by examiner

FIG. 16A-C

AUTOMOBILE FRONT PILLAR LOWER STRUCTURE

TECHNICAL FIELD

The present invention relates to an automobile front pillar lower structure.

BACKGROUND ART

In an automobile front pillar structure described in Patent Document 1 mentioned below, a lower end portion of a pillar reinforce extending in an up-down direction along an inner surface of a front pillar and a front end portion of a side sill (rocker) provided on the floor side along a vehicle front-rear direction are joined to each other.

As other prior art documents related to the present application invention, there are Patent Documents 2 to 4 mentioned below.

PRIOR ART DOCUMENT

Patent Document

Patent Document 1: Japanese Patent Application Publication No. 2002-337734
Patent Document 2: Japanese Patent Application Publication No. 2011-136593
Patent Document 3: Japanese Patent Application Publication No. 4-334665
Patent Document 4: Japanese Patent Application Publication No. 7-089450

SUMMARY OF THE INVENTION

Problem to be Solved by the Invention

In the meantime, when a vehicle width direction outer side portion relative to a front side member at a front portion of an automobile collides head-on with another vehicle or the like (at the time of a so-called small overlap collision), collision energy cannot be absorbed by deformation of the front side member. In such a case, an excessive load from a front wheel moving rearward toward the front pillar side may possibly be input to a joint portion between a front pillar outer reinforcement and a rocker outer reinforcement. If the joint portion is broken by this excessive load, the amount of retreat of the front pillar increases so that the amount of deformation of a vehicle compartment increases.

In consideration of the above-mentioned fact, it is an object of the present invention to obtain an automobile front pillar lower structure capable of suppressing deformation of a vehicle compartment at the time of a small overlap collision.

Means for Solving the Problem

An automobile front pillar lower structure in a first aspect of the present invention includes: a pillar reinforcement formed in an elongated shape extending in a longitudinal direction of a front pillar and configured to reinforce the front pillar; a rocker reinforcement formed in an elongated shape extending in a longitudinal direction of a rocker and configured to reinforce the rocker, the rocker reinforcement having a front end portion joined to a lower end portion of the pillar reinforcement; and a joint reinforcing portion joined to or integrally provided to the lower end portion of the pillar reinforcement and having a front wall covering the rocker reinforcement from a vehicle front side and a lower wall extending toward a vehicle rear side from a lower end of the front wall and joined to a lower surface of the rocker reinforcement, the front wall and the lower wall extending from a side wall located on an outer side in a vehicle width direction of the rocker reinforcement.

In the first aspect, the joint reinforcing portion joined to or integrally provided to the lower end portion of the pillar reinforcement is included. In this joint reinforcing portion, the front wall and the lower wall extend from the side wall located on the outer side in the vehicle width direction of the rocker reinforcement. The front wall covers the rocker reinforcement from the vehicle front side, while the lower wall extends toward the vehicle rear side from the lower end of the front wall and is joined to the lower surface of the rocker reinforcement. Since the strength of a joint portion between the pillar reinforcement and the rocker reinforcement can be improved by this joint reinforcing portion, it is possible to prevent or suppress breakage of the joint portion at the time of a small overlap collision.

Further, for example, when a load from a front wheel moving rearward due to a small overlap collision is input to the front pillar, it is possible to transmit the load to the lower surface of the rocker reinforcement via the joint reinforcing portion. As a result, an upward lift load acts on the front end portion of the rocker reinforcement so that the load from the front wheel can be dispersed to the rocker reinforcement side. Consequently, the amount of falling of the front pillar toward the vehicle rear side can be reduced.

Further, in this aspect, the rocker reinforcement is covered by the front wall of the joint reinforcing portion from the vehicle front side. Therefore, for example, when a load from the front wheel is input around the front end portion of the rocker, since a pressure receiving portion of the load is covered by the joint reinforcing portion, the relative displacement between the front pillar and the rocker can be made small. As a result, it is possible to effectively suppress breakage or cracking of the joint portion between the pillar reinforcement and the rocker reinforcement so that the respective reinforcements are allowed to function as structural reinforcing members until the termination of collision. Consequently, the amount of deformation around the front end portion of the rocker can be effectively reduced. Therefore, in this aspect, it is possible to suppress deformation of a vehicle compartment at the time of a small overlap collision.

An automobile front pillar lower structure in a second aspect of the present invention is configured such that, in the first aspect, the front end portion of the rocker reinforcement is provided with a convex portion protruding toward the outer side in the vehicle width direction, wherein the convex portion is inserted into an opening formed in the side wall of the joint reinforcing portion.

In the second aspect, the joint reinforcing portion joined to or integrally provided to the lower end portion of the pillar reinforcement is formed with the opening and the convex portion provided at the front end portion of the rocker reinforcement is inserted into the opening. Accordingly, when an upward lift load acts on the front end portion of the rocker reinforcement via the joint reinforcing portion due to input of a load from the front wheel to the front pillar at the time of a small overlap collision, the convex portion abuts against an edge portion of the opening so that the load that acts on the lower wall of the joint reinforcing portion can be dispersed to such an abutting portion. As a result, it is possible to increase the lift load that acts on the front end portion of the rocker reinforcement and, therefore, the effect of suppression of falling of the front pillar by the rigidity of the rocker reinforcement can be improved.

An automobile front pillar lower structure in a third aspect of the present invention is configured such that, in the first aspect, the rocker reinforcement is provided with a front wall portion, wherein the side wall of the joint reinforcing portion is joined to an outer surface in the vehicle width direction of the rocker reinforcement and the front wall of the joint reinforcing portion is joined to a front surface of the front wall portion.

In the third aspect, the joint reinforcing portion joined to or integrally provided to the lower end portion of the pillar reinforcement is configured such that the side wall is joined to the outer surface in the vehicle width direction of the rocker reinforcement, that the lower wall is joined to the lower surface of the rocker reinforcement, and that the front wall is joined to the front surface of the front wall portion of the rocker reinforcement. In this manner, by joining the joint reinforcing portion at its three surfaces to the rocker reinforcement, it is possible to effectively improve the joint strength between the joint reinforcing portion and the rocker reinforcement.

An automobile front pillar lower structure in a fourth aspect of the present invention is configured such that, in the second aspect, the joint reinforcing portion is formed separately from the pillar reinforcement, wherein a portion, on the vehicle front side relative to the opening in the side wall, of the joint reinforcing portion and the convex portion of the rocker reinforcement are individually joined to the lower end portion of the pillar reinforcement.

In the fourth aspect, in an initial stage where a load from the front wheel starts to be input to the front pillar at the time of a small overlap collision, an upward lift load acts between the pillar reinforcement and the joint reinforcing portion. In this event, the joining state between the pillar reinforcement and the joint reinforcing portion can be maintained by a joint portion between the portion, on the vehicle front side relative to the opening in the side wall, of the joint reinforcing portion and the lower end portion of the pillar reinforcement.

On the other hand, after the front portion side of the joint reinforcing portion is broken due to the load from the front wheel, a load toward the vehicle rear side transmitted from the pillar reinforcement to the rocker reinforcement increases. In this event, the joining state between the rocker reinforcement and the pillar reinforcement can be maintained by a joint portion between the convex portion, inserted into the opening of the joint reinforcing portion, of the rocker reinforcement and the lower end portion of the pillar reinforcement. As described above, in this aspect, the upward load and the load toward the vehicle rear side can be shared by the different joint portions suitable for the respective loads.

An automobile front pillar lower structure in a fifth aspect of the present invention is configured such that, in the first aspect, the joint reinforcing portion is formed separately from the pillar reinforcement, wherein the side wall of the joint reinforcing portion is formed with a pair of front and rear elongated holes, wherein a longitudinal direction of the front elongated hole is along a vehicle up-down direction and a longitudinal direction of the rear elongated hole is inclined so as to go toward the vehicle front side as going toward a vehicle upper side, and wherein front edge portions of the elongated holes are joined to the pillar reinforcement.

In the fifth aspect, the front edge portions of the pair of front and rear elongated holes formed in the side wall of the joint reinforcing portion are welded to the pillar reinforcement by a means such as, for example, arc welding. The front elongated hole has its longitudinal direction along the vehicle up-down direction, while the rear elongated hole is inclined so that its longitudinal direction goes toward the vehicle front side as going toward the vehicle upper side. Therefore, in an initial stage where a load from the front wheel is input to the front pillar at the time of a small overlap collision, a lift load to the rocker front end portion can be increased at a joint portion between the front edge portion of the front elongated hole and the pillar reinforcement.

On the other hand, after the front portion side of the joint reinforcing portion starts to be broken due to the load from the front wheel, variation occurs in the input position of the load from the front wheel. In this event, the front pillar falls toward the vehicle rear side so that the rear elongated hole rises along the vehicle up-down direction. Therefore, the lift load to the rocker front end portion can be increased at a joint portion between the front edge portion of the rear elongated hole and the pillar reinforcement. Consequently, it is possible to improve the robustness when increasing the lift load to the rocker front end portion.

An automobile front pillar lower structure in a sixth aspect of the present invention is configured such that, in the first aspect, the pillar reinforcement includes a front pillar outer reinforcement and a hinge reinforcement joined to an inner side of the front pillar outer reinforcement, wherein a side wall portion of the front pillar outer reinforcement is joined to an outer surface in the vehicle width direction of the rocker reinforcement and a side wall portion of the hinge reinforcement extends downward so that a lower end portion of the side wall portion of the hinge reinforcement is interposed between the side wall portion of the front pillar outer reinforcement and the outer surface in the vehicle width direction of the rocker reinforcement.

In the sixth aspect, since the lower end portion of the hinge reinforcement extends downward as described above, a shearing load that is generated between the front pillar outer reinforcement and the rocker reinforcement due to a load from the front wheel at the time of a small overlap collision can be reduced by the rigidity of the hinge reinforcement. Consequently, it is possible to prevent or effectively suppress the occurrence of shear fracture between the front pillar outer reinforcement and the rocker reinforcement.

An automobile front pillar lower structure in a seventh aspect of the present invention is configured such that, in the first aspect, the joint reinforcing portion is formed separately from the pillar reinforcement, wherein the front wall of the joint reinforcing portion is joined to a front surface of the pillar reinforcement and the joint reinforcing portion has a rear wall joined to a rear surface of the pillar reinforcement so that the pillar reinforcement is fitted between the front wall and the rear wall.

In the seventh aspect, the pillar reinforcement is fitted between the front wall and the rear wall of the joint reinforcing portion, and the front surface and the rear surface of the pillar reinforcement are joined to the front wall and the rear wall of the joint reinforcing portion. Consequently, it is possible to effectively improve the joint strength between the pillar reinforcement and the joint reinforcing portion so that it is possible to prevent or effectively suppress the relative displacement between the pillar reinforcement and the joint reinforcing portion due to a load from the front wheel at the time of a small overlap collision.

An automobile front pillar lower structure in an eighth aspect of the present invention is configured such that, in the first aspect, a bracket joined to the pillar reinforcement above the joint reinforcing portion forms a closed cross section jointly with the pillar reinforcement.

In the eighth aspect, since the bracket as described above is provided, it is possible to improve the rigidity of the front pillar above the joint reinforcing portion. Herein, in the case where a wheel of the front wheel is made of steel, the wheel may possibly be deformed into a generally 8-shape in side view due to a load at the time of a small overlap collision so that loads from the front wheel may be input to upper and lower two portions of the front pillar. Even in such a case, cross-sectional deformation of the front pillar due to the upper-side load can be suppressed by the bracket, while cross-sectional deformation of the front pillar due to the lower-side load can be suppressed by the joint reinforcing portion. Consequently, it is possible to effectively suppress deformation of the front pillar.

An automobile front pillar lower structure in a ninth aspect of the present invention is configured such that, in the first aspect, the rocker reinforcement is formed in a shape of an open cross section that is open inward in the vehicle width direction as seen from a vehicle front-rear direction, wherein a knot-like bulk is joined to an inner side of the open cross section.

In the ninth aspect, since the cross section of the rocker reinforcement is reinforced by the bulk, it is possible to effectively suppress cross-sectional deformation of the rocker reinforcement at the time of a small overlap collision. As a result, the amount of retreat of the front pillar, i.e. the amount of deformation of the vehicle compartment, can be more effectively reduced.

Effects of the Invention

As described above, with an automobile front pillar lower structure according to the present invention, it is possible to suppress deformation of a vehicle compartment at the time of a small overlap collision.

MODES FOR CARRYING OUT THE INVENTION

First Embodiment

An automobile front pillar lower structure 10 according to a first embodiment of the present invention will be described with reference to FIGS. 1 to 11. An arrow FR, an arrow UP, and an arrow OUT shown in the figures as appropriate respectively indicate a vehicle forward direction (travel direction), a vehicle upward direction, and an outer side in a vehicle width direction. Hereinbelow, when a description is given using a direction of merely forward or rearward or a direction of merely upward or downward, it indicates forward or rearward in a vehicle front-rear direction or upward or downward in a vehicle up-down direction unless otherwise stated.

(Configuration)

Figure 1:
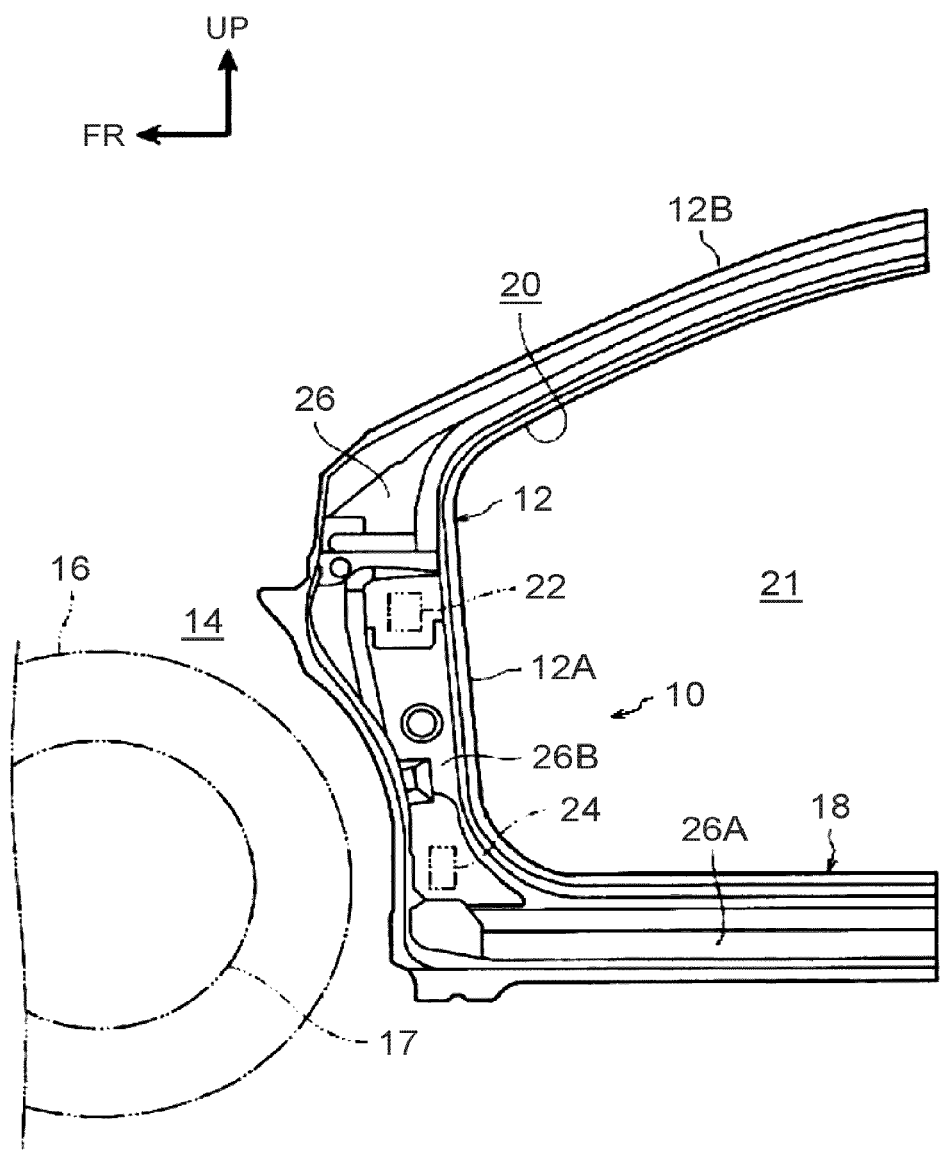
FIG. 1 is a side view showing a configuration around a front pillar of an automobile to which an automobile front pillar lower structure according to a first embodiment of the present invention is applied.

FIG. 1 shows, in a side view, a configuration around a front pillar 12 (A-pillar) in an automobile to which the front pillar lower structure 10 is applied. The automobile in this embodiment is, for example, a normal sedan-type automobile.

The front pillar 12 includes a front pillar lower 12A extending in the vehicle up-down direction and a front pillar upper 12B extending obliquely upward in the vehicle rear direction from an upper end of the front pillar lower 12A. A wheel house 14 is formed on the vehicle front side of the front pillar lower 12A and a front wheel 16 is disposed in the wheel house 14. A rocker 18 extends toward the vehicle rear side from a lower end of the front pillar lower 12A. A member denoted by symbol 17 in FIG. 1 is a wheel of the front wheel 16.

The front pillar 12 and the rocker 18 are closed cross-sectional members constituting a vehicle body skeleton and form, jointly with a roof side rail and a center pillar (B-pillar), not shown, a door opening portion 20 for an occupant to get on and off. The door opening portion 20 is formed at a side portion of a vehicle compartment 21 and configured to be opened and closed by a side door not shown. The side door is pivotally coupled at its front end portion to the front pillar 12 via a pair of upper and lower door hinges 22 and 24 and configured to open and close the door opening portion 20 by this pivotal movement.

Outer walls at an outer end in the vehicle width direction of the front pillar 12 and the rocker 18 are formed by a common side outer panel 26 which is a large pressed component. Although not shown, the rocker 18 and the roof side rail extend to a rear pillar.

A rocker outer portion 26A, forming the rocker 18, of the side outer panel 26 has a hat-shaped cross section that is open inward in the vehicle width direction as seen from the vehicle front-rear direction. A rocker inner panel not shown is joined to the rocker outer portion 26A on the inner side thereof in the vehicle width direction. Consequently, the rocker 18 is formed in a closed cross-sectional shape. A rocker outer reinforcement 28 shown in FIGS. 2 to 6 is provided in a closed cross section of the rocker 18.

The rocker outer reinforcement 28 is a constituent member of a rocker reinforcement 29 (rocker reinforcing member). The rocker reinforcement 29 is formed in an elongated shape extending in a longitudinal direction of the rocker 18 and is configured to reinforce the rocker 18. The rocker outer reinforcement 28 is made of a high-strength metal plate material having a plate thickness greater than those of the side outer panel 26 and the rocker inner panel. The rocker outer reinforcement 28 has a hat-shaped cross section that is open inward in the vehicle width direction as seen from the vehicle front-rear direction.

Specifically, the rocker outer reinforcement 28 is configured such that an upper wall portion 28B and a lower wall portion 28C extend inward in the vehicle width direction from vehicle upper and lower ends of a side wall portion 28A and that flanges 28D project from inner ends in the vehicle width direction of the upper wall portion 28B and the lower wall portion 28C. The upper and lower flanges 28D of the rocker outer reinforcement 28 are sandwiched between the rocker outer portion 26A and the rocker inner panel and joined thereto by a means such as spot welding.

Figure 3:
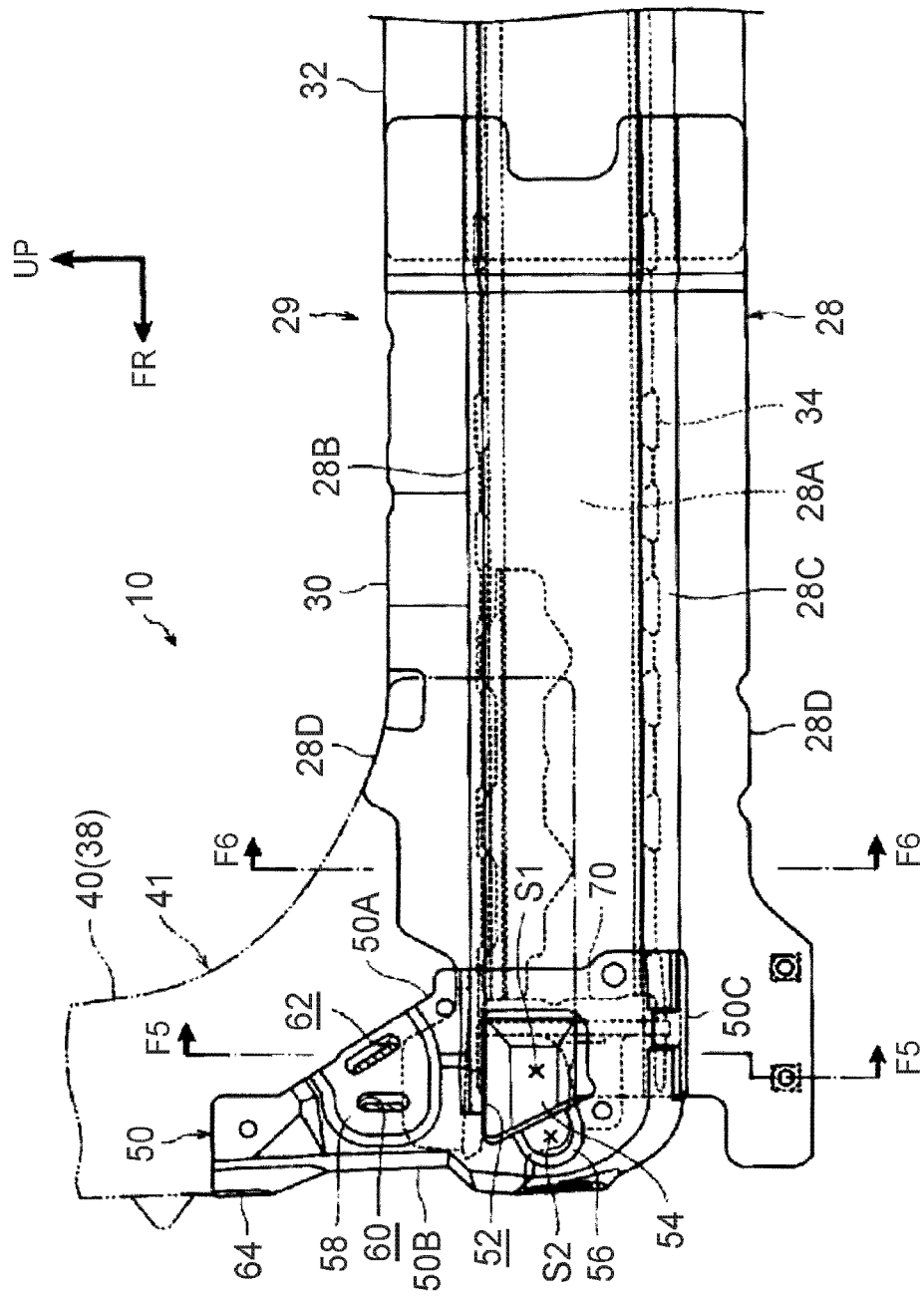
FIG. 3 is a side view of a gusset and a rocker reinforcement provided in the front pillar lower structure.
Figure 6:
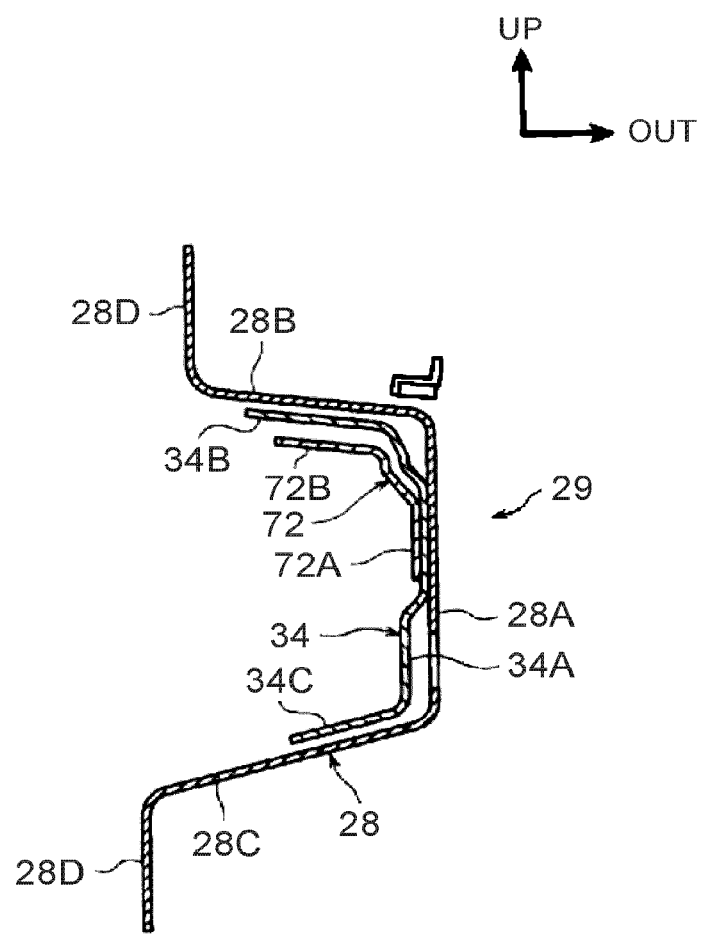
FIG. 6 is an enlarged cross-sectional view showing in an enlarged scale a cross section taken along line F6-F6 of FIG. 3.

The rocker outer reinforcement 28 is formed so as to be divided into a front portion 30 and a rear portion 32 shown in FIG. 3, and a rear end portion of the front portion 30 and a front end portion of the rear portion 32 are overlapped and joined together by a means such as spot welding. As shown in FIG. 6, an inner reinforcement 34 as a constituent member of the rocker reinforcement 29 is disposed in a cross section of the rocker outer reinforcement 28.

The inner reinforcement 34 includes a side wall portion 34A joined to the side wall portion 28A of the rocker outer reinforcement 28 and an upper wall portion 34B and a lower wall portion 34C extending inward in the vehicle width direction from vehicle upper and lower ends of the side wall portion 34A and is formed in a generally U-shape in cross section that is open inward in the vehicle width direction as seen from the vehicle front-rear direction. The inner reinforcement 34 is joined to the rocker outer reinforcement 28 in a state of lying astride the front portion 30 and the rear portion 32 (see FIG. 3) and the rocker reinforcement 29 as a whole is formed in an open cross-sectional shape that is open inward in the vehicle width direction as seen from the vehicle front-rear direction.

Figure 7:
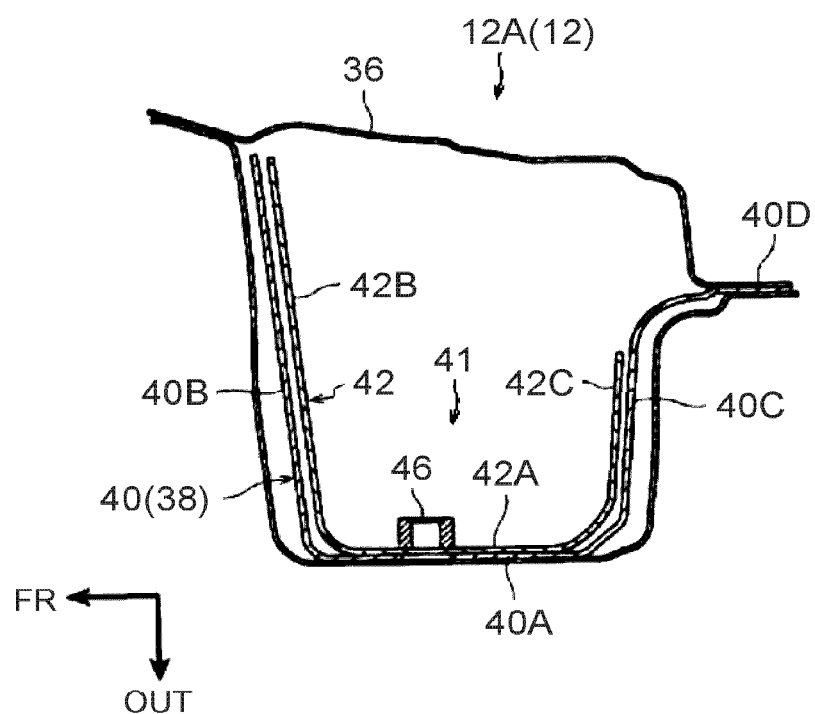
FIG. 7 is an enlarged cross-sectional view showing in an enlarged scale a cross section taken along line F7-F7 of FIG. 2.
Figure 8:
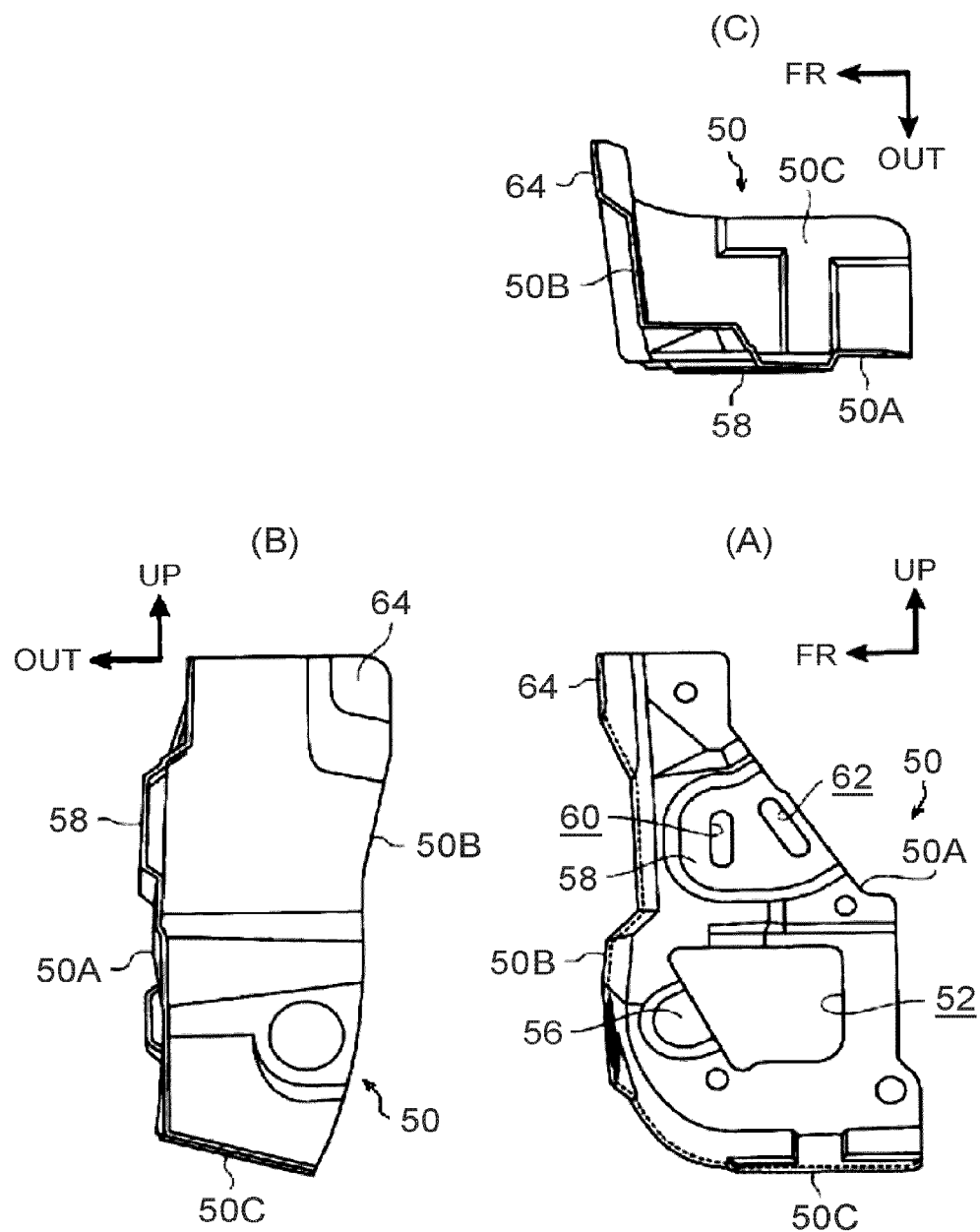
FIG. 8A-C (A) is a side view of the gusset, (B) is a front view of the gusset, and (C) is a plan view of the gusset.

On the other hand, as shown in FIG. 7, a front pillar outer portion 26B, forming the front pillar lower 12A, of the side outer panel 26 has a hat-shaped cross section that is open inward in the vehicle width direction as seen from the vehicle up-down direction. A front pillar inner panel 36 is joined to the front pillar outer portion 26B on the inner side thereof in the vehicle width direction. Consequently, the front pillar lower 12A is formed in a closed cross-sectional shape.

An outer reinforcement lower 40 forming a lower portion of a front pillar outer reinforcement 38 is provided in a closed cross section of the front pillar lower 12A. The front pillar outer reinforcement 38 is a constituent member of a pillar reinforcement 41. The pillar reinforcement 41 is a member formed in an elongated shape extending in a longitudinal direction of the front pillar 12 and configured to reinforce the front pillar 12.

An outer reinforcement upper, not shown, forming an upper portion of the front pillar outer reinforcement 38 is joined to an upper end portion of the outer reinforcement lower 40. The outer reinforcement lower 40 and the outer reinforcement upper are each made of a high-strength metal plate material having a plate thickness greater than those of the side outer panel 26 and the front pillar inner panel 36.

The outer reinforcement lower 40 has a hat-shaped cross section that is open inward in the vehicle width direction as seen from the vehicle up-down direction. Specifically, the outer reinforcement lower 40 is configured such that a front wall portion 40B and a rear wall portion 40C extend inward in the vehicle width direction from vehicle front and rear ends of a side wall portion 40A and that flanges 40D project from inner ends in the vehicle width direction of the front wall portion 40B and the rear wall portion 40C. The front and rear flanges 40D of the outer reinforcement lower 40 are sandwiched between the front pillar outer portion 26B and the front pillar inner panel 36 and joined thereto by a means such as spot welding.

Figure 4:
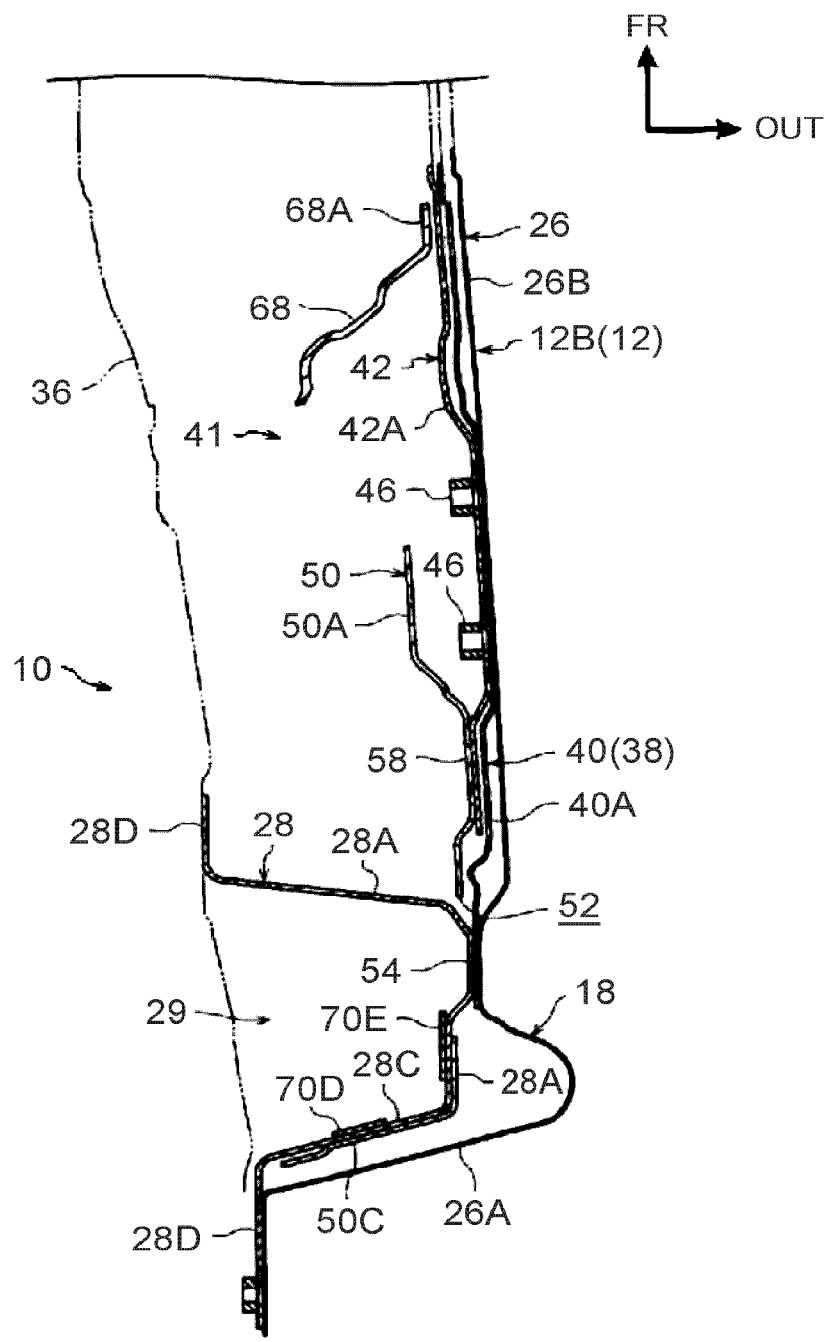
FIG. 4 is an enlarged cross-sectional view showing in an enlarged scale a cross section taken along line F4-F4 of FIG. 2.

A hinge reinforcement 42 as a constituent member of the pillar reinforcement 41 is provided on the inner side of the outer reinforcement lower 40. The hinge reinforcement 42 has a generally U-shaped cross section that is open inward in the vehicle width direction as seen from the vehicle up-down direction. Specifically, the hinge reinforcement 42 includes a side wall portion 42A fastened to the side wall portion 40A of the outer reinforcement lower 40 along with the lower door hinge 24 and a front wall portion 42B and a rear wall portion 42C extending inward in the vehicle width direction from vehicle front and rear ends of the side wall portion 42A. The front wall portion 42B and the rear wall portion 42C are joined to the front wall portion 40B and the rear wall portion 40C of the outer reinforcement lower 40 by a means such as spot welding. Members denoted by symbol 46 in FIG. 4 are nuts for fastening the door hinge 24.

A rocker joining portion 40A1 joined to the rocker outer reinforcement 28 is provided at a lower end portion of the outer reinforcement lower 40. The rocker joining portion 40A1 extends toward the vehicle rear side and is sandwiched between a front end portion of the rocker outer portion 26A and a front end portion of the rocker outer reinforcement 28 and joined thereto by a means such as spot welding. The rocker joining portion 40A1 is joined to the front end portion of the rocker outer reinforcement 28 at a plurality of portions by the means such as spot welding.

Further, in this embodiment, a lower end portion of the outer reinforcement lower 40 and a front end portion of the rocker outer reinforcement 28 are joined to each other via a gusset 50 as a joint reinforcing portion. In this embodiment, the gusset 50 is formed separately from the pillar reinforcement 41 and joined to the pillar reinforcement 41. The gusset 50 is made of, for example, a high-strength metal plate material having a plate thickness equal to that of the rocker outer reinforcement 28 and, as shown in FIG. 8(A) to FIG. 8(C), integrally includes a side wall 50A, a lower wall 50C, and a front wall 50B.

The side wall 50A is provided on the outer side in the vehicle width direction of the rocker outer reinforcement 28 in a state where the plate thickness direction of the side wall 50A is along the vehicle width direction. The side wall 50A is formed in an elongated shape in the vehicle up-down direction and, as shown in FIG. 4, its upper portion side extends to the inside of the hinge reinforcement 42. This upper portion side of the side wall 50A faces the side wall portion 42A of the hinge reinforcement 42 from the inner side in the vehicle width direction.

Figure 5:
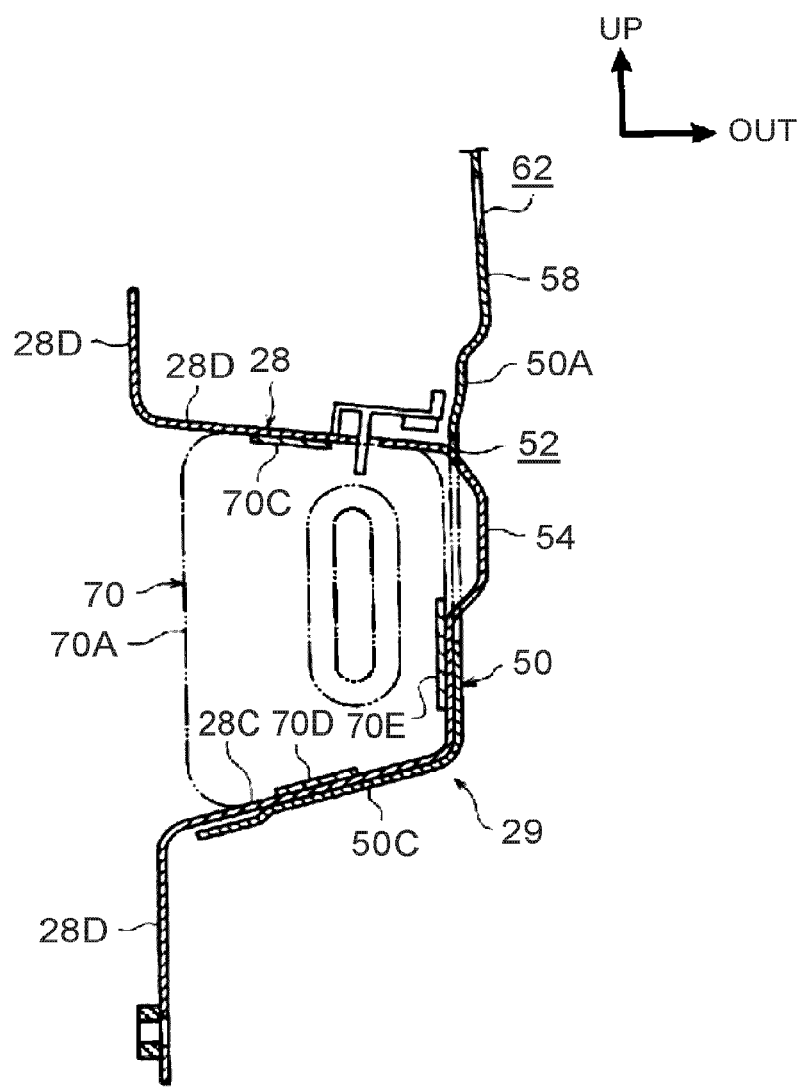
FIG. 5 is an enlarged cross-sectional view showing in an enlarged scale a cross section taken along line F5-F5 of FIG. 3.

The side wall 50A is formed at its lower portion with an opening 52 of a rectangular shape as seen from the vehicle width direction. Corresponding to the opening 52, a convex portion 54 (bulging portion) bulging toward the outer side in the vehicle width direction is provided at a front end portion of the side wall portion 28A of the rocker outer reinforcement 28. As shown in FIGS. 4 and 5, the convex portion 54 is inserted into the opening 52 and protrudes to the outer side in the vehicle width direction of the side wall 50A. A lower end portion of the outer reinforcement lower 40 overlaps an outer surface in the vehicle width direction of the convex portion 54 so that the convex portion 54, the lower end portion of the outer reinforcement lower 40, and the side outer panel 26 are joined together in three plies by a means such as spot welding (see point 51 shown in FIG. 3).

Further, at a lower portion of the side wall 50A, a lower joining portion 56 bulging toward the outer side in the vehicle width direction is provided at a position on the vehicle front side relative to the opening 52. A lower end portion of the outer reinforcement lower 40 overlaps an outer surface in the vehicle width direction of the lower joining portion 56 so that the lower joining portion 56, the lower end portion of the outer reinforcement lower 40, and the side outer panel 26 are joined together in three plies by a means such as spot welding (see point S2 shown in FIG. 3).

Further, the side wall 50A is provided at its upper portion with an upper joining portion 58 bulging toward the outer side in the vehicle width direction. The upper joining portion 58 is formed with a pair of front and rear elongated holes 60 and 62. The front elongated hole 60 is formed so that its longitudinal direction is along the vehicle up-down direction, while the rear elongated hole 62 is inclined so that its longitudinal direction goes toward the vehicle front side as going toward the vehicle upper side. In this embodiment, an inclination angle θ of the longitudinal direction of the elongated hole 62 relative to the vehicle up-down direction is set in a range of, for example, $30° \leq \theta \leq 45°$.

Front edge portions of the elongated holes 60 and 62 are joined by arc welding to an inner surface in the vehicle width direction of the side wall portion 42A of the hinge reinforcement 42. That is, the elongated holes 60 and 62 are arc working holes for joining an upper portion of the side wall 50A to the hinge reinforcement 42 by arc welding.

On the other hand, the lower wall 50C integrally extends from a lower end of the side wall 50A toward the inner side in the vehicle width direction along a lower surface of the lower wall portion 28C of the rocker outer reinforcement 28 and is joined to the lower surface of the lower wall portion 28C by a means such as spot welding. The lower wall 50C extends toward the vehicle rear side from a lower end of the front wall 50B.

The front wall 50B integrally extends from a front end of the side wall 50A toward the inner side in the vehicle width direction and the lower end side thereof is curved toward the vehicle rear side so as to be integrally continuous with the lower wall 50C. A front end portion of the rocker reinforcement 29 is covered by the front wall 50B from the vehicle front side. The upper portion side of the front wall 50B extends to the inside of the hinge reinforcement 42 and faces the front wall portion 42B of the hinge reinforcement 42 from the vehicle rear side.

A front joining portion 64 bulging toward the vehicle front side is provided at an inner end portion in the vehicle width direction of an upper end portion of the front wall 50B. The front wall portion 42B of the hinge reinforcement 42 overlaps a front end surface of the front joining portion 64 so that the front joining portion 64 and the front wall portion 42B are joined together by a means such as spot welding.

The gusset 50 configured as described above is joined to the pillar reinforcement 41 and the rocker reinforcement 29 in a state of vertically straddling a joint portion 51 between the pillar reinforcement 41 and the rocker reinforcement 29.

Figure 2:
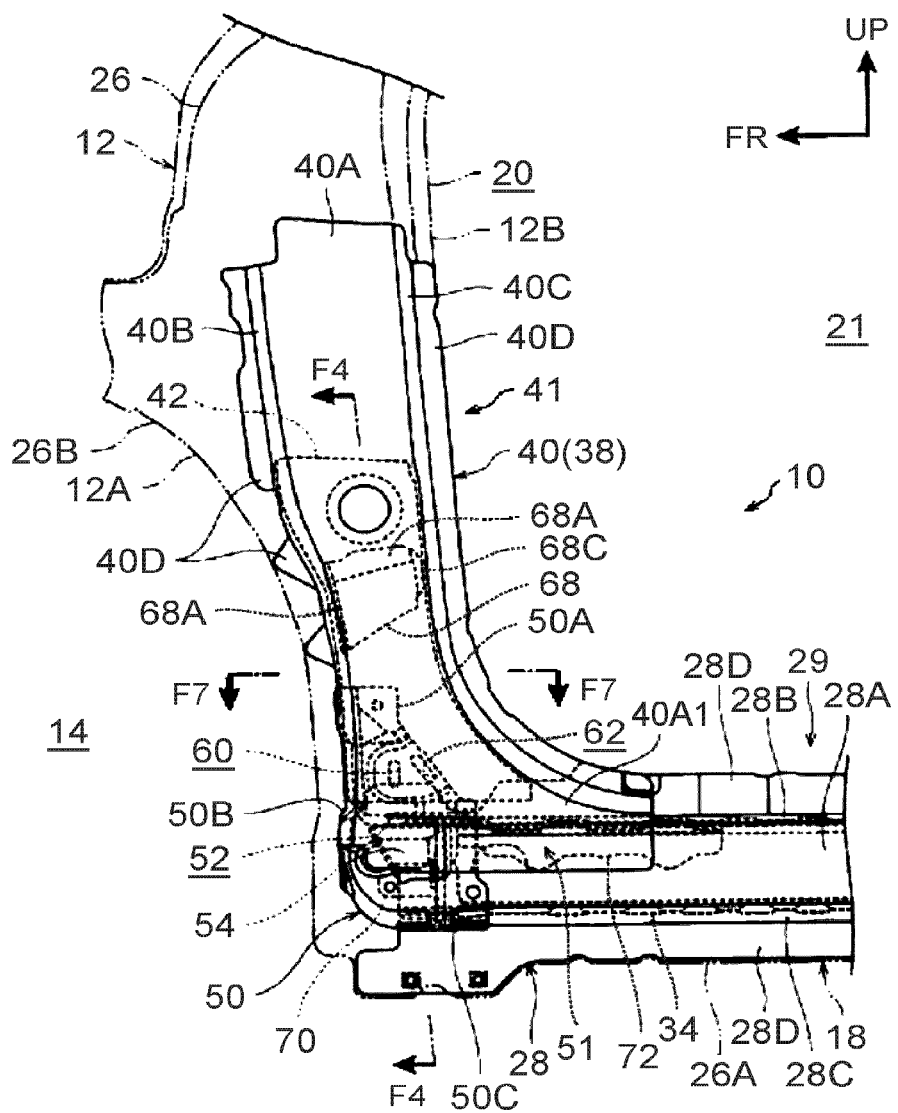
FIG. 2 is an enlarged side view of a part of the configuration shown in FIG. 1.

In this embodiment, as shown in FIGS. 2 and 4, a bracket 68 configured to reinforce a cross section of the hinge reinforcement 42 is provided above the gusset 50. The bracket 68 is made of, for example, a high-strength metal plate material having a plate thickness greater than that of the rocker outer reinforcement 28. The bracket 68 is located above the door hinge 24 and extends from the side wall portion 42A of the hinge reinforcement 42 obliquely toward the inner side in the vehicle width direction and toward the vehicle lower side. An outer flange 68A extends upward from an end portion, on the side wall portion 42A side, of the bracket 68 and is joined to an inner surface in the vehicle width direction of the side wall portion 42A by a means such as spot welding.

From vehicle front and rear ends of the bracket 68, a front flange 68B and a rear flange 68C extend along the front wall portion 42B and the rear wall portion 42C of the hinge reinforcement 42. The front flange 68B is joined to a rear surface of the front wall portion 42B of the hinge reinforcement 42 by a means such as spot welding, while the rear flange 68C is joined to a front surface of the rear wall portion 42C of the hinge reinforcement 42 by a means such as spot welding. The bracket 68 forms a closed cross section jointly with the hinge reinforcement 42.

Figure 9:
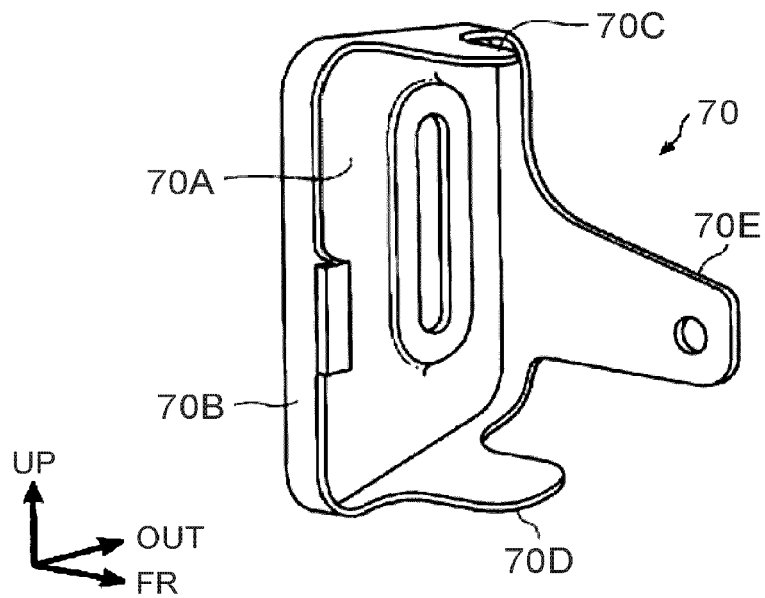
FIG. 9 is a perspective view of a bulk provided in the rocker reinforcement of the front pillar lower structure.

In this embodiment, on the inner side of the front end portion of the rocker outer reinforcement 28, a bulk 70 is provided on the vehicle front side relative to the inner reinforcement 34 described earlier. The bulk 70 is made of, for example, a high-strength metal plate material having a plate thickness greater than that of the rocker outer reinforcement 28 and, as shown in FIG. 9, includes a generally rectangular body portion 70A. The body portion 70A is fitted to the inside of the rocker outer reinforcement 28 in a state where the plate thickness direction of the body portion 70A is along the vehicle front-rear direction (see two-dot chain lines in FIG. 5).

A peripheral wall 70B extends toward the vehicle front side from the peripheral edge of the body portion 70A, and an upper joining piece 70C, a lower joining piece 70D, and an outer joining piece 70E respectively extend toward the vehicle front side from an upper end portion, a lower end portion, and an outer end portion in the vehicle width direction of the peripheral wall 70B. The upper joining piece 70C is joined to a lower surface of the upper wall portion 28B, the lower joining piece 70D is joined to an upper surface of the lower wall portion 28C, and the outer joining piece 70E is joined to an inner surface in the vehicle width direction of the side wall portion 28A. A cross section of the rocker outer reinforcement 28 is reinforced by the bulk 70.

Figure 10:
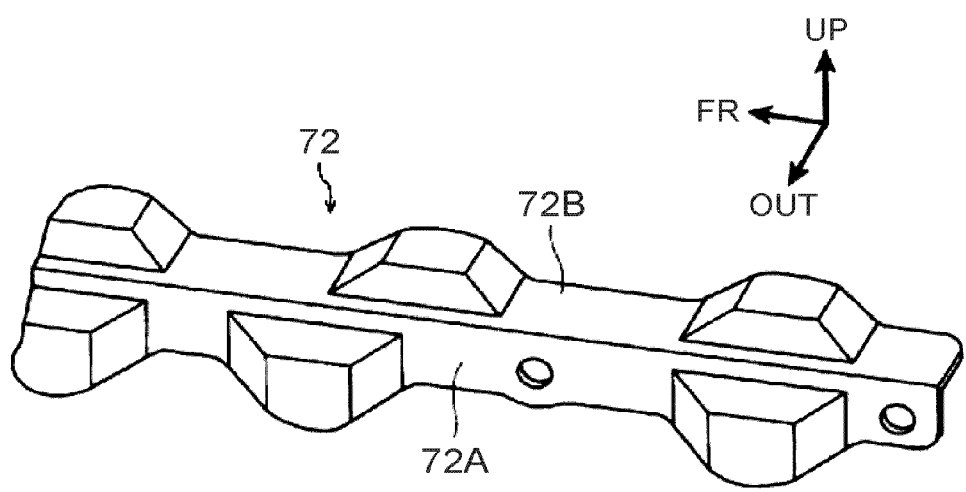
FIG. 10 is a perspective view of a reinforcing panel provided in the rocker reinforcement of the front pillar lower structure.
Figure 11:
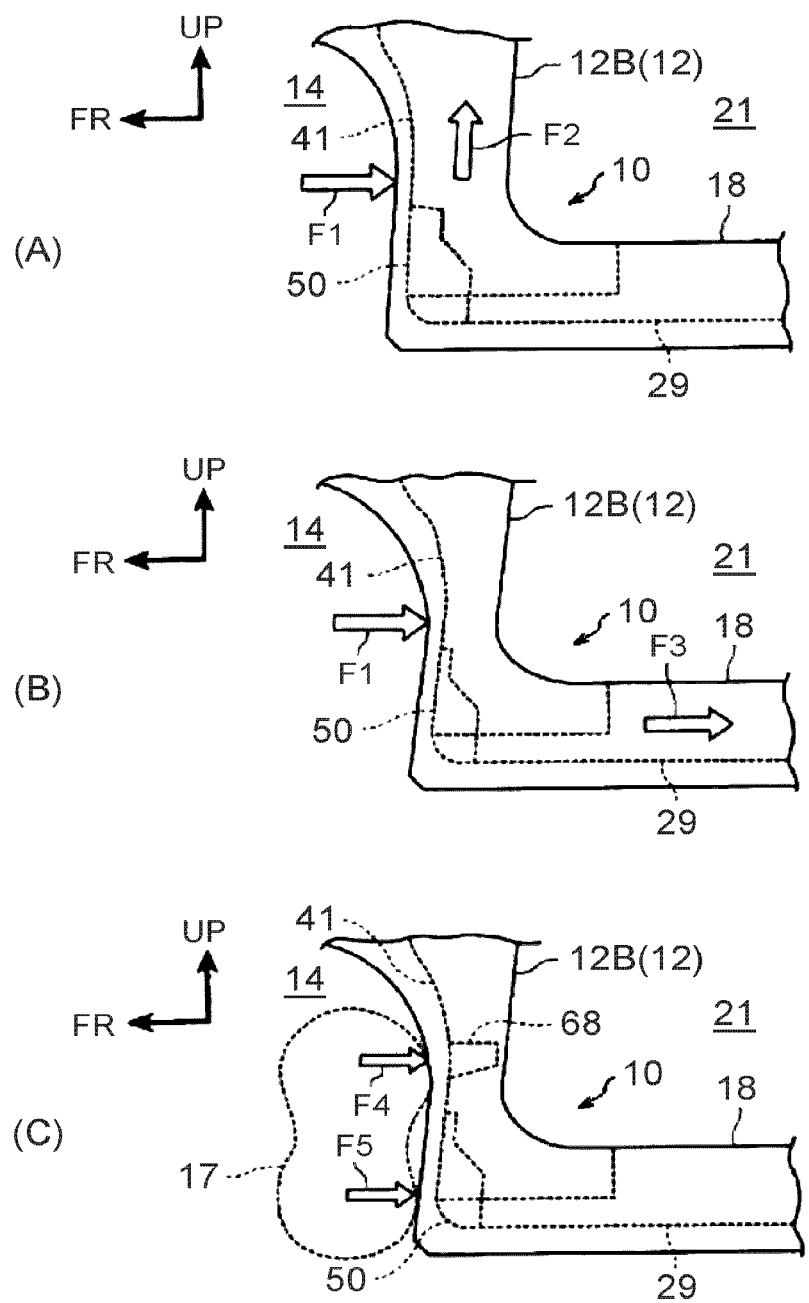
FIG. 11A-C (A) is a side view showing an initial stage where a load from a front wheel is input to the front pillar at the time of a small overlap collision in the front pillar lower structure, (B) is a side view showing a state where the front portion side of the gusset is broken due to the load from the front wheel, and (C) is a side view showing a state where loads from a wheel deformed into a generally 8-shape are input to the front pillar.

Further, in this embodiment, a reinforcing panel 72 (see FIG. 6) is provided on the inner side of the inner reinforcement 34 on the vehicle rear side of the bulk 70. The reinforcing panel 72 is made of for example, a high-strength metal plate material having a plate thickness equal to that of the rocker outer reinforcement 28 and is formed in an elongated shape extending in the vehicle front-rear direction. As shown in FIG. 10, the reinforcing panel 72 includes a longitudinal wall 72A and an upper wall 72B extending inward in the vehicle width direction from an upper end of the longitudinal wall 72A. The longitudinal wall 72A is joined to the side wall portion 34A of the inner reinforcement 34, while the upper wall 72B is joined to a front end portion of the upper wall portion 34B of the inner reinforcement 34. Consequently, the front end portion of the rocker reinforcement 29 is reinforced.

(Actions and Effects)

Next, the actions and effects of this first embodiment will be described.

In the automobile front pillar lower structure 10 configured as described above, the gusset 50 provided in the state of vertically straddling the joint portion 51 between the pillar reinforcement 41 and the rocker reinforcement 29 is joined to the respective reinforcements 41 and 29 so that the joint portion 51 is reinforced by the gusset 50. In the gusset 50, the front wall 50B and the lower wall 50C extend from the side wall 50A located on the outer side in the vehicle width direction of the rocker reinforcement 29. The front wall 50B covers the rocker reinforcement 29 from the vehicle front side, while the lower wall 50C extends toward the vehicle rear side from the lower end of the front wall 50B and is joined to the lower surface of the rocker reinforcement 29. Since the strength of the joint portion 51 can be improved by the gusset 50, it is possible to prevent or effectively suppress breakage of the joint portion 51 at the time of a small overlap collision.

Further, for example, when a load F1 (see FIG. 11(A)) from the front wheel 16 moving rearward due to a small overlap collision is input to the front pillar 12, it is possible to transmit the load to the lower surface of the rocker reinforcement 29 via the gusset 50. As a result, an upward lift load F2 (see FIG. 11(A)) acts on the front end portion of the rocker reinforcement 29 so that the load F1 from the front wheel 16 can be dispersed to the rocker reinforcement 29 side. Consequently, the amount of falling of the front pillar 12 toward the vehicle rear side can be reduced so that it is possible to effectively suppress deformation of the vehicle compartment 21.

Further, in this embodiment, the convex portion 54 provided at the front end portion of the side wall portion 28A of the rocker outer reinforcement 28 is inserted from the inner side in the vehicle width direction into the opening 52 formed in the side wall 50A of the gusset 50. Accordingly, when the lift load F2 acts on the front end portion of the rocker reinforcement 29 due to the input of the load F1 from the front wheel 16 to the front pillar 12, the convex portion 54 abuts against an edge portion of the opening 52 so that the load that acts on the lower wall 50C of the gusset 50 can be dispersed to such an abutting portion. As a result, it is possible to increase the lift load F2 that acts on the front end portion of the rocker reinforcement 29 and, therefore, the effect of suppression of falling of the front pillar 12 by the rigidity of the rocker reinforcement 29 can be improved.

Further, in this embodiment, the convex portion 54 of the rocker reinforcement 29 is joined to the lower end portion of the pillar reinforcement 41 and the lower joining portion 56 of the gusset 50 is joined to the lower end portion of the pillar reinforcement 41.

Herein, in the initial stage where the load F1 from the front wheel 16 starts to be input to the front pillar 12, the lift load F2 described above acts between the pillar reinforcement 41 and the gusset 50. In this event, the joining state between the pillar reinforcement 41 and the gusset 50 can be maintained by the joint portion between the lower joining portion 56 of the gusset 50 and the lower end portion of the pillar reinforcement 41.

On the other hand, after the front portion side of the gusset 50 is broken due to the load F1 from the front wheel 16, a load F3 (see FIG. 11(B)) toward the vehicle rear side transmitted from the pillar reinforcement 41 to the rocker reinforcement 29 increases. In this event, the joining state between the rocker reinforcement 29 and the pillar reinforcement 41 can be maintained by the joint portion between the convex portion 54, inserted into the opening 52 of the gusset 50, of the rocker reinforcement 29 and the lower end portion of the pillar reinforcement 41. As described above, in this configuration, the upward load and the load toward the vehicle rear side can be shared by the different joint portions suitable for the respective loads.

Further, in this embodiment, the front edge portions of the pair of front and rear elongated holes 60 and 62 formed at the upper portion of the side wall 50A of the gusset 50 are welded to the pillar reinforcement 41 by arc welding. The front elongated hole 60 has its longitudinal direction along the vehicle up-down direction, while the rear elongated hole 62 is inclined so that its longitudinal direction goes toward the vehicle front side as going toward the vehicle upper side. Therefore, in the initial stage where the load F1 from the front wheel 16 is input to the front pillar 12, the lift load F2 to the rocker front end portion can be increased at the joint portion between the front edge portion of the front elongated hole 60 and the pillar reinforcement.

On the other hand, after the front portion side of the gusset 50 starts to be broken due to the load F1 from the front wheel 16, variation occurs in the input position of the load from the front wheel. In this event, the front pillar 12 falls toward the vehicle rear side so that the rear elongated hole 62 rises along the vehicle up-down direction. Therefore, the lift load F2 to the rocker front end portion can be increased at the joint portion between the front edge portion of the rear elongated hole 62 and the pillar reinforcement. Consequently, it is possible to improve the robustness when increasing the lift load F2.

Further, in this embodiment, the bracket 68 provided above the gusset 50 and joined to the hinge reinforcement 42 forms a closed cross section jointly with the hinge reinforcement 42. Therefore, the rigidity of the front pillar 12 can be improved above the gusset 50.

Herein, in the case where the wheel of the front wheel 16 is made of steel, the wheel 17 may possibly be deformed into a generally 8-shape in side view (see a two-dot chain line in FIG. 11(C)) due to a load at the time of a small overlap collision so that loads F4 and F5 from the front wheel 16 may be input to upper and lower two portions of the front pillar (see FIG. 11(C)). Even in such a case, cross-sectional deformation of the front pillar 12 due to the upper-side load F4 can be suppressed by the bracket 68, while cross-sectional deformation of the front pillar 12 due to the lower-side load F5 can be suppressed by the gusset 50. Consequently, it is possible to effectively suppress deformation of the front pillar 12.

Next, another embodiment of the present invention will be described. A description of basically the same configurations and actions as those in the above-described first embodiment will be omitted by assigning the same symbols as those in the above-described first embodiment.

Second Embodiment

Figure 12:
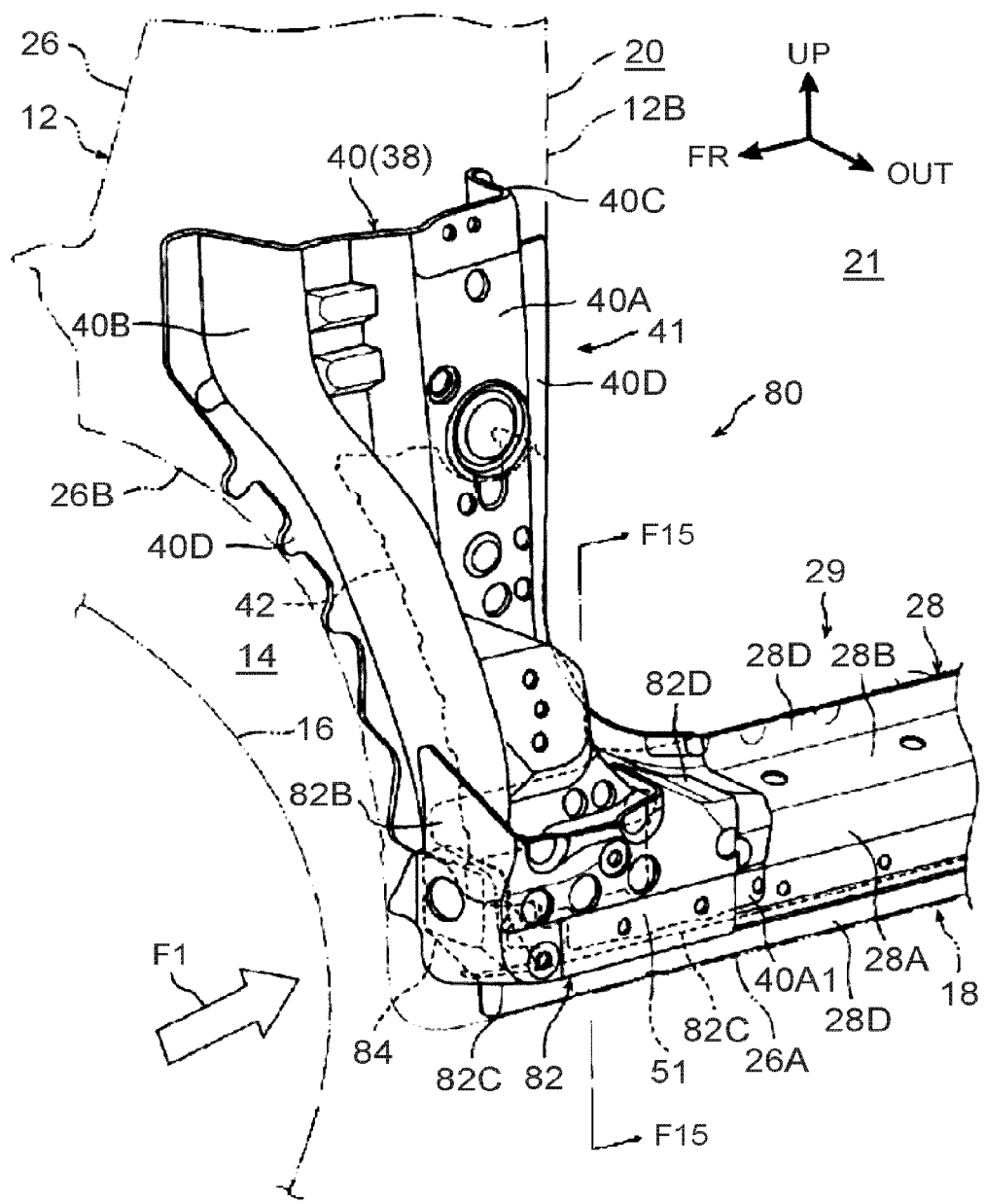
FIG. 12 is a perspective view showing a configuration around a front pillar of an automobile to which an automobile front pillar lower structure according to a second embodiment of the present invention is applied.

FIG. 12 shows, in a perspective view, a partial configuration of a vehicle body side portion of an automobile to which an automobile front pillar lower structure 80 according to a second embodiment of the present invention is applied. The automobile in this embodiment is, for example, a so-called sport utility vehicle in which the position of a vehicle body relative to a front wheel 16 is set higher than that in a sedan-type automobile.

(Configuration)

Figure 13:
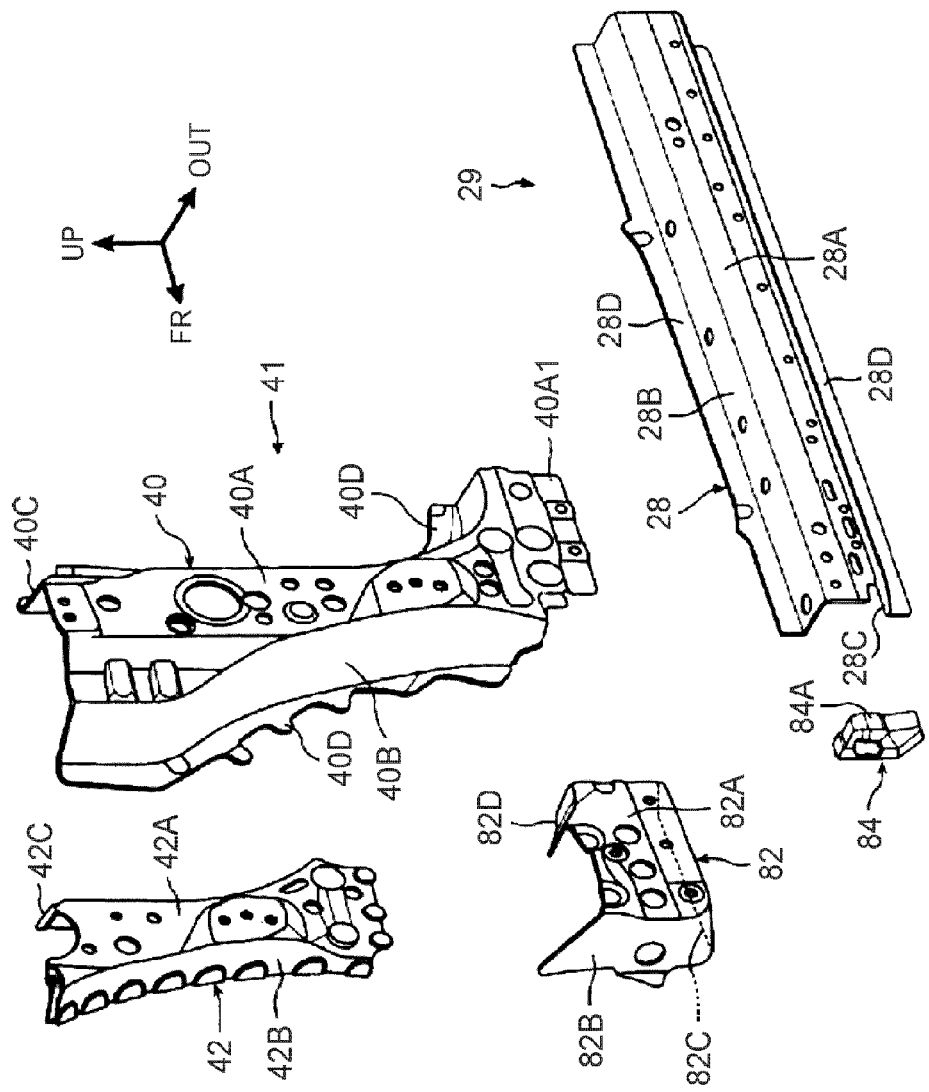
FIG. 13 is an exploded perspective view showing configurations of a pillar reinforcement, a rocker reinforcement, and a reinforcing member which are constituent members of the front pillar lower structure.
Figure 14:
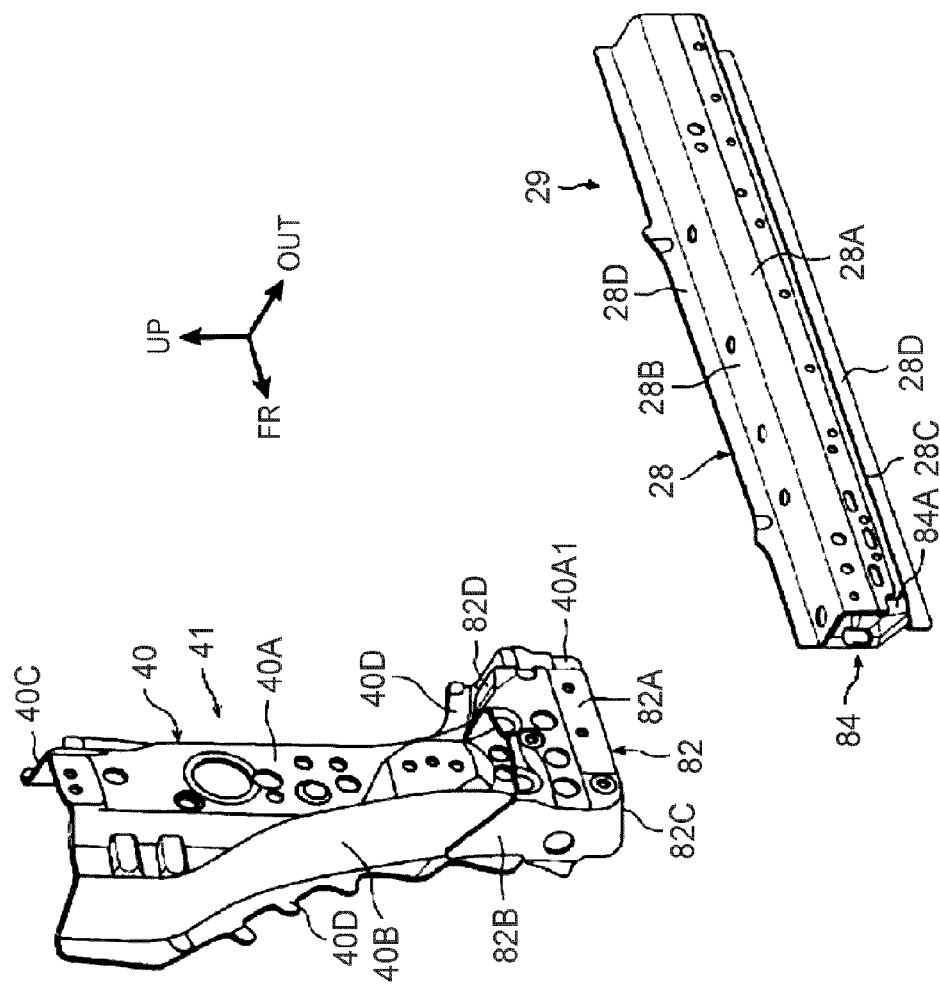
FIG. 14 is a perspective view showing configurations of the pillar reinforcement joined at its lower end portion with the reinforcing member and a rocker outer reinforcement.

This embodiment includes a pillar reinforcement 41 and a rocker reinforcement 29 having basically the same configurations as the pillar reinforcement 41 and the rocker reinforcement 29 according to the above-described first embodiment (see FIGS. 13 and 14). In this embodiment, however, another reinforcement not shown is joined to the inner side of a hinge reinforcement 42 provided in the pillar reinforcement 41.

Figure 15:
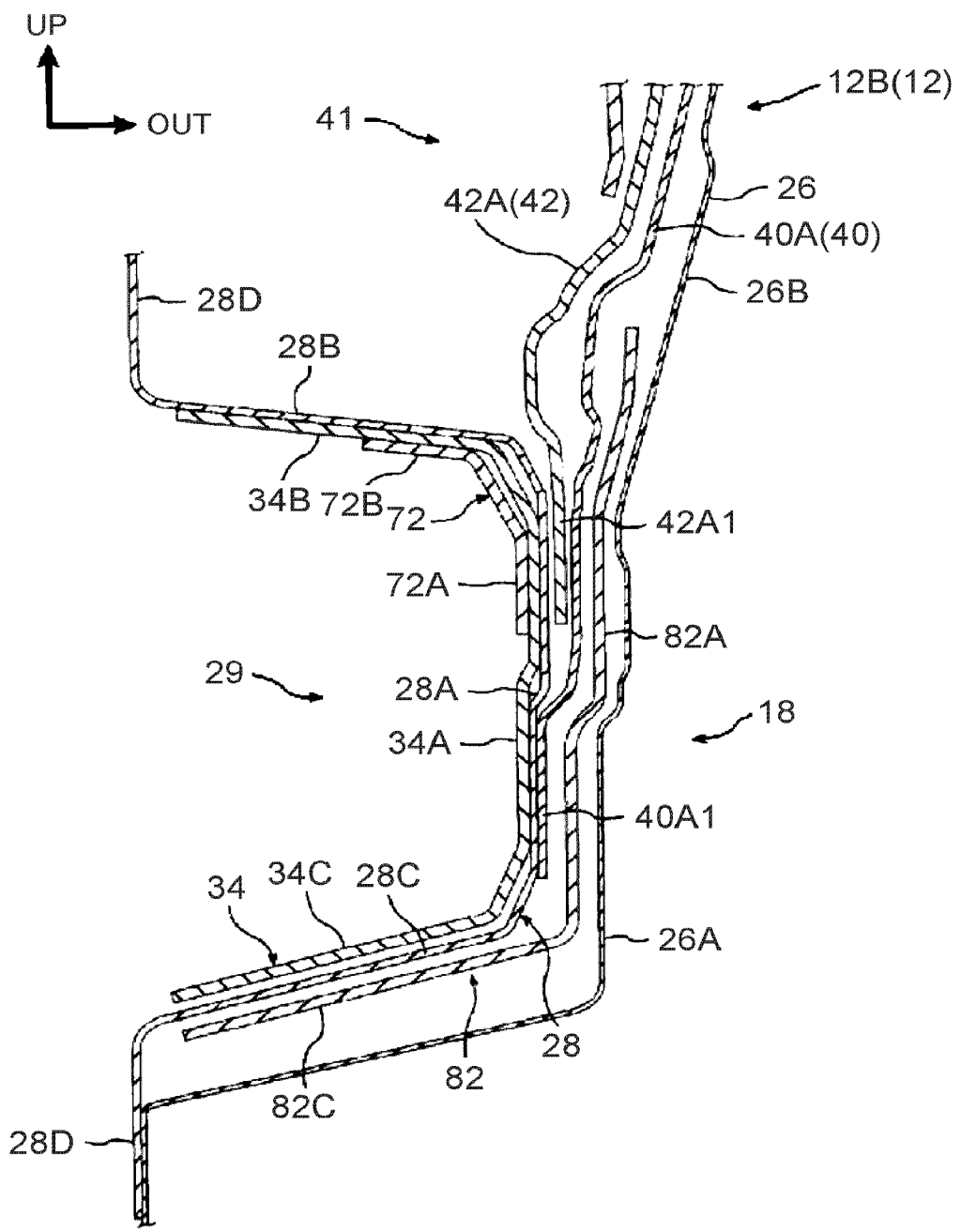
FIG. 15 is an enlarged cross-sectional view showing in an enlarged scale a cross section taken along line F15-F15 of FIG. 12.

In this embodiment, as shown in FIG. 15, a side wall portion 40A of an outer reinforcement lower 40 extends downward and a rocker joining portion 40A1 provided at a lower end portion of the side wall portion 40A overlaps an outer surface in the vehicle width direction of a side wall portion 28A of a rocker outer reinforcement 28 (an outer surface in the vehicle width direction of the rocker reinforcement 29). In FIG. 15, the rocker joining portion 40A1 overlaps a lower portion of the outer surface in the vehicle width direction of the side wall portion 28A, but not limited to this. The position where the rocker joining portion 40A1 overlaps the outer surface in the vehicle width direction of the side wall portion 28A can be changed as appropriate.

Further, in this embodiment, a side wall portion 42A of the hinge reinforcement 42 extends downward and a lower end portion 42A1 of the side wall portion 42A is interposed between the side wall portion 40A of the outer reinforcement lower 40 and the side wall portion 28 of the rocker outer reinforcement 28 (an outer surface in the vehicle width direction of the rocker reinforcement 29).

In this embodiment, a reinforcing member 82 as a joint reinforcing portion is provided instead of the gusset 50 according to the above-described first embodiment. Like the gusset 50, the reinforcing member 82 is made of a high-strength metal plate material having a large plate thickness and is formed separately from the pillar reinforcement 41 and joined to a lower end portion of the pillar reinforcement 41. The reinforcing member 82 includes a side wall 82A, a lower wall 82C, and a front wall 82B like the gusset 50 and further includes a rear wall 82D and a front flange 82E differently from the gusset 50.

Differently from the side wall 50A of the gusset 50, the side wall 82A of the reinforcing member 82 is formed in an elongated shape extending in the vehicle front-rear direction. The side wall 82A overlaps an outer surface in the vehicle width direction of the rocker joining portion 40A1 so that the side wall 82A, the rocker joining portion 40A1, and the side wall portion 28A are joined together in three plies by a means such as spot welding. Further, the side wall 82A, the rocker joining portion 40A1, and the lower end portion of the hinge reinforcement 42 are joined together in three plies by a means such as spot welding.

Like the front wall 50B of the gusset 50, the front wall 82B integrally extends from a front end of the side wall 82A toward the inner side in the vehicle width direction and covers the rocker reinforcement 29 from the vehicle front side. However, differently from the front wall 50B of the gusset 50, the upper portion side of the front wall 82B overlaps a front surface of a front wall portion 40B of the outer reinforcement lower 40 (a front surface of the pillar reinforcement 41) and is joined to the front wall portion 40B by a means such as spot welding.

Like the lower wall 50C of the gusset 50, the lower wall 82C extends toward the vehicle rear side from a lower end of the front wall 82B and is integrally continuous with the front wall 82B. The lower wall 82C integrally extends from a lower end of the side wall 82A toward the inner side in the vehicle width direction and, in a state of overlapping a lower surface of a lower wall portion 28C of the rocker outer reinforcement 28 (a lower surface of the rocker reinforcement 29), is joined to the lower wall portion 28C by a means such as spot welding.

The rear wall 82D extends toward the inner side in the vehicle width direction from the rear end side of an upper end portion of the side wall 82A and, in a state of overlapping a lower end portion of a rear wall 40C of the outer reinforcement lower 40 (a rear surface of the pillar reinforcement 41) from the vehicle rear side and the vehicle upper side, is joined to the rear wall 82D by a means such as spot welding. That is, in this embodiment, the lower end portion of the pillar reinforcement 41 is fitted between the front wall 82B and the rear wall 82D of the reinforcing member 82.

Figure 16:
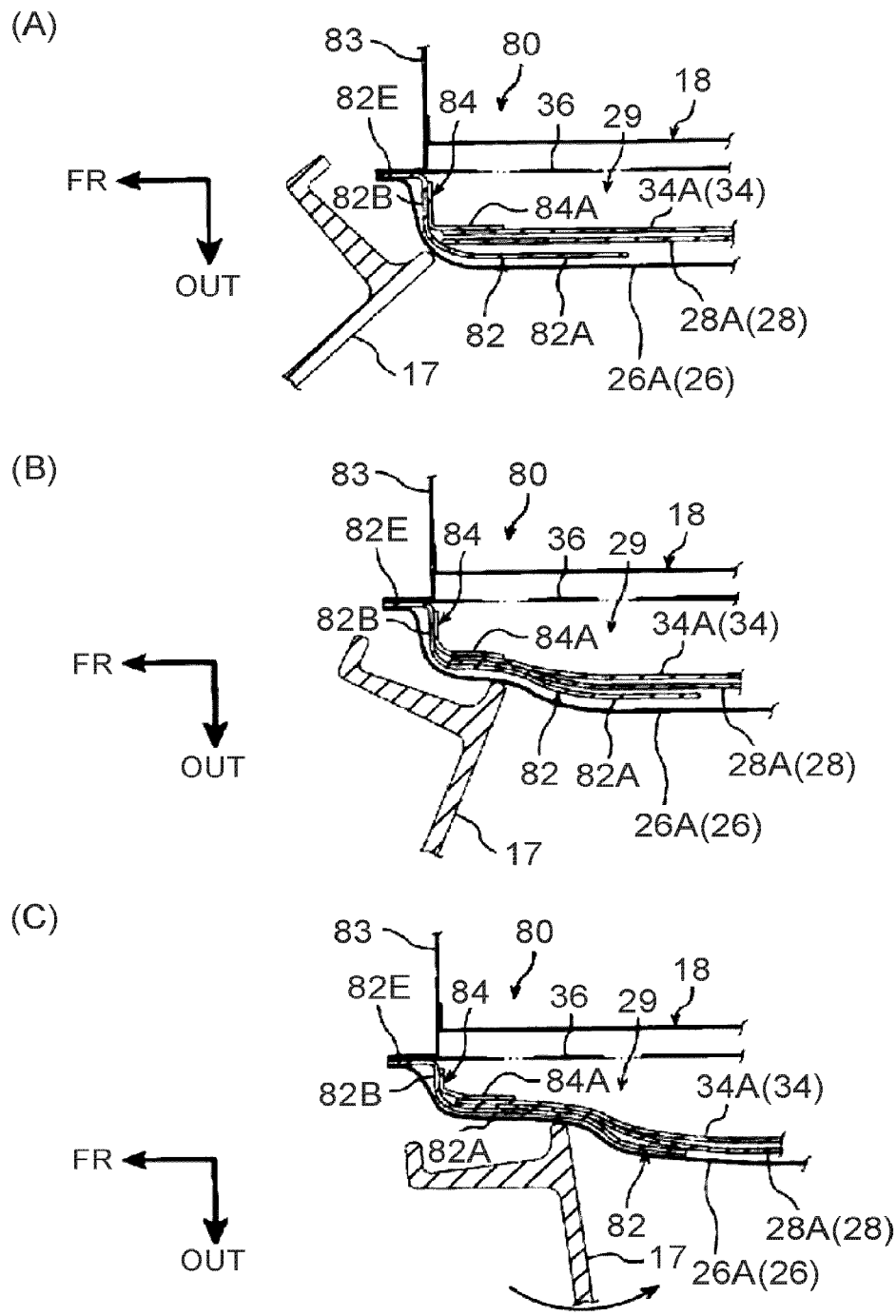
FIG. 16A-C (A) is a transverse sectional view showing a state where a wheel of a front wheel collides with a front end portion of a rocker in the front pillar lower structure, (B) is a transverse sectional view showing a state where the front end portion of the rocker is slightly deformed due to a load from the wheel, and (C) is a transverse sectional view showing a state where the wheel has fallen off to the vehicle rear side.

The front flange 82E is sandwiched between a front pillar outer portion 26B of a side outer panel 26 and a dash panel 83 (see FIG. 16(A) to FIG. 16(C)) so that the front pillar outer portion 26B, the front flange 82E, a front pillar inner panel 36, and the dash panel 83 are joined together in four plies by a means such as spot welding.

The reinforcing member 82 configured as described above is joined to the pillar reinforcement 41 and the rocker reinforcement 29 in a state of vertically straddling a joint portion 51 (see FIG. 12) between the pillar reinforcement 41 and the rocker reinforcement 29.

In this embodiment, a cover member 84 forming a front wall portion of the rocker reinforcement 29 is joined to the inner side of a front end portion of the rocker reinforcement 29. The cover member 84 is made of a high-strength metal plate material having a large plate thickness and has a peripheral wall 84A extending from an outer peripheral portion toward the vehicle rear side and joined to a side wall portion 34A, an upper wall portion 34B, and a lower wall portion 34C of an inner reinforcement 34 (see FIG. 15) by a means such as spot welding.

A front surface of the cover member 84 overlaps a rear surface of the front wall 82B of the reinforcing member 82 and is joined to the front wall 82B by a means such as spot welding. That is, the reinforcing member 82 according to this embodiment is joined to the outer surface in the vehicle width direction, the lower surface, and the front surface (three surfaces) of the rocker reinforcement 29.

(Actions and Effects)

Next, the actions and effects of this second embodiment will be described.

In the automobile front pillar lower structure 80 configured as described above, the reinforcing member 82 provided in the state of vertically straddling the joint portion 51 between the pillar reinforcement 41 and the rocker reinforcement 29 is joined to the respective reinforcements 41 and 29 so that the joint portion 51 is reinforced by the reinforcing member 82. In the reinforcing member 82, the lower wall 82C and the front wall 82B extend from the side wall 82A located on the outer side in the vehicle width direction of the rocker reinforcement 29. The front wall 82B covers the rocker reinforcement 29 from the vehicle front side, while the lower wall 82C extends toward the vehicle rear side from the lower end of the front wall 82B and is joined to the lower surface of the rocker reinforcement 29. Since the strength of the joint portion 51 can be improved by the reinforcing member 82, it is possible to prevent or effectively suppress breakage of the joint portion 51 at the time of a small overlap collision.

Further, in this embodiment, the rocker reinforcement 29 is covered by the front wall 82B of the reinforcing member 82 from the vehicle front side. Therefore, for example, when a load F1 (see FIG. 12) from the front wheel 16 is input around a front end portion of a rocker 18, since a pressure receiving portion of the load F1 is covered by the reinforcing member 82, the relative displacement between a front pillar 12 and the rocker 18 can be made small. As a result, it is possible to effectively suppress breakage or cracking of the joint portion 51 between the pillar reinforcement 41 and the rocker reinforcement 29 so that the respective reinforcements 41 and 29 are allowed to function as structural reinforcing members until the termination of collision. Consequently, the amount of deformation around the front end portion of the rocker 18 can be effectively reduced so that it is possible to suppress deformation of a vehicle compartment 21 at the time of a small overlap collision.

Further, in this embodiment, the front wall portion of the rocker reinforcement 29 is formed by the cover member 84 joined to the inner side of the front end portion of the rocker reinforcement 29 and the front surface of the cover member 84 is joined to the rear surface of the front wall 82B of the reinforcing member 82. That is, the reinforcing member 82 is configured such that the side wall 82A is joined to the outer surface in the vehicle width direction of the rocker reinforcement 29, that the lower wall 82C is joined to the lower surface of the rocker reinforcement 29, and that the front wall 82B is joined to the front surface of the rocker reinforcement 29. In this manner, by joining the reinforcing member 82 at its three surfaces to the rocker reinforcement 29, it is possible to effectively improve the joint strength between the reinforcing member 82 and the rocker reinforcement 29. As a result, the amount of deformation around the front end portion of the rocker 18 can be more effectively reduced.

For example, as shown in FIG. 16(A), even when a wheel 17 of the front wheel 16 collides with the front end portion of the rocker 18, since the front wall 82B of the reinforcing member 82 is joined to the front surface of the rocker reinforcement 29 (herein, the cover member 84) so that the rigidity is improved, it is possible to suppress deformation of the reinforcing member 82. As a result, as shown in FIG. 16(B) and FIG. 16(C), it is possible to facilitate falling-off of the wheel 17 to the outer side in the vehicle width direction as early as possible so that it is possible to suppress damage around the front end portion of the rocker 18. A situation of a collision of the wheel 17 of the front wheel 16 with the front end portion of the rocker 18 is not limited to that shown in FIG. 16(A) to FIG. 16(C). According to the configuration of this embodiment, it is possible to suppress damage around the front end portion of the rocker 18 in various collision situations of the wheel 17 (front wheel 16).

In this embodiment, the side wall portion 42A of the hinge reinforcement 42 extends downward and the lower end portion 42A1 of the side wall portion 42A is interposed between the side wall portion 40A of the outer reinforcement lower 40 and the outer surface in the vehicle width direction of the rocker reinforcement 29. Therefore, a shearing load that is generated between the outer reinforcement lower 40 and the rocker reinforcement 29 due to a load from the front wheel 16 at the time of a small overlap collision can be reduced by the rigidity of the hinge reinforcement 42. Consequently, it is possible to prevent or effectively suppress the occurrence of shear fracture between the outer reinforcement lower 40 and the rocker reinforcement 29.

Further, in this embodiment, the lower end portion of the pillar reinforcement 41 is fitted between the front wall 82B and the rear wall 82D of the reinforcing member 82, and the front surface and the rear surface of the pillar reinforcement 41 are joined to the front wall 82B and the rear wall 82D of the reinforcing member 82. Consequently, it is possible to effectively improve the joint strength between the pillar reinforcement 41 and the reinforcing member 82 so that it is possible to prevent or effectively suppress the relative displacement between the pillar reinforcement 41 and the reinforcing member 82 due to a load from the front wheel 16 at the time of a small overlap collision.

Supplementary Explanation of Embodiments

Figure 17:
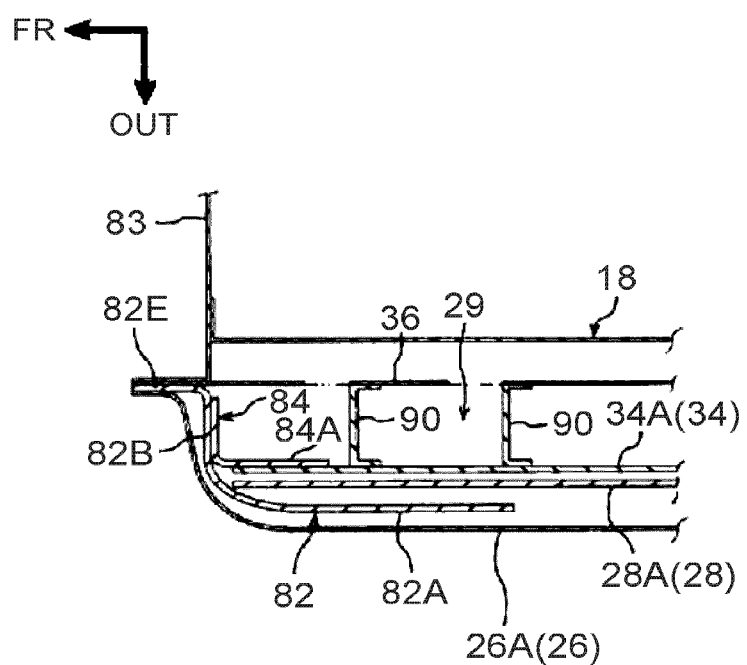
FIG. 17 is a transverse sectional view showing a modification of the front pillar lower structure.

In the above-described second embodiment, as shown in FIG. 17, it may be configured that one or a plurality of knot-like bulks 90 are joined to the inner side of an open cross section of the rocker reinforcement 29. Since the cross section of the rocker reinforcement 29 is reinforced by the bulks 90, it is possible to effectively suppress cross-sectional deformation of the rocker reinforcement 29 at the time of a small overlap collision. As a result, the amount of retreat of the front pillar 12, i.e. the amount of deformation of the vehicle compartment 21, can be more effectively reduced.

In the above-described second embodiment, it is configured that the reinforcing member 82 as the joint reinforcing portion is formed separately from the pillar reinforcement 41 and joined to the lower end portion of the pillar reinforcement 41. However, the present invention is not limited thereto. It may be configured that a joint reinforcing portion is integrally provided to a lower end portion of the pillar reinforcement 41, i.e., for example, it may be configured that a joint reinforcing portion is integrally provided to a lower end portion of the outer reinforcement lower 40 (configured that a joint reinforcing portion is formed by a lower end portion of the outer reinforcement lower).

In the above-described second embodiment, it is configured that the cover member 84 forming the front wall portion of the rocker reinforcement 29 is formed separately from the rocker outer reinforcement 28 and the inner reinforcement 34 and joined to the inner reinforcement 34. However, the present invention is not limited thereto. It may be configured that a front wall portion of the rocker reinforcement 29 is integrally formed with the rocker outer reinforcement 28 or the inner reinforcement 34.

In the above-described first embodiment, the description is given of the case where the present invention is applied to the sedan-type automobile, while, in the above-described second embodiment, the description is given of the case where the present invention is applied to the so-called sport utility vehicle. However, the present invention is not limited thereto and can also be applied to automobiles of types other than the above.

In each of the above-described embodiments, it is configured that the gusset 50 or the reinforcing member 82 (each the joint reinforcing portion) includes the side wall 50A or 82A. However, a side wall of a joint reinforcing portion is satisfactory if it enhances the rigidity of the joint reinforcing portion, and thus may be one that extends in a flange shape from a front wall and a lower wall.

In addition, the present invention can be carried out with various changes within a range not departing from the gist thereof. Naturally, the scope of rights of the present invention is not limited to the above-described embodiments.

The invention claimed is:

1. A front pillar lower structure of an automobile comprising:
   a pillar reinforcement formed in an elongated shape extending in a longitudinal direction of a front pillar and configured to reinforce the front pillar;
   a rocker reinforcement formed in an elongated shape extending in a longitudinal direction of a rocker and configured to reinforce the rocker, the rocker reinforcement having a front end portion joined to a lower end portion of the pillar reinforcement; and
   a joint reinforcing portion formed separately from the pillar reinforcement,
   wherein the joint reinforcing portion is joined to the lower end portion of the pillar reinforcement and has a front wall, a lower wall which extends toward a vehicle rear side from a lower end of the front wall and is joined to a lower surface of the rocker reinforcement, and a side wall located on an outer side in a vehicle width direction of the rocker reinforcement,
   wherein the rocker reinforcement includes a rocker outer reinforcement including a side wall portion, an upper wall portion and a lower wall portion which extend in the vehicle width direction from vehicle upper and lower ends of the side wall portion, and flanges which project from inner ends in the vehicle width direction of the upper wall portion and the lower wall portion, and the lower surface of the rocker reinforcement is the lower wall portion of the rocker outer reinforcement.

2. The front pillar lower structure according to claim 1, wherein the front end portion of the rocker reinforcement is provided with a convex portion protruding toward the outer side in the vehicle width direction and the convex portion is inserted into an opening formed in the side wall of the joint reinforcing portion.

3. The front pillar lower structure according to claim 2, wherein a portion, on the vehicle front side relative to the opening in the side wall, of the joint reinforcing portion and the convex portion of the rocker reinforcement are individually joined to the lower end portion of the pillar reinforcement.

4. The automobile front pillar lower structure according to claim 1, wherein the rocker reinforcement is provided with a front wall portion, the side wall of the joint reinforcing portion is joined to an outer surface in the vehicle width direction of the rocker reinforcement, and the front wall of the joint reinforcing portion is joined to a front surface of the front wall portion.

5. The front pillar lower structure according to claim 1, wherein the side wall of the joint reinforcing portion is formed with a pair of front and rear elongated holes, a longitudinal direction of the front elongated hole is along a vehicle up-down direction, a longitudinal direction of the rear elongated hole is inclined so as to go toward the vehicle front side as going toward a vehicle upper side, and wherein front edge portions of the elongated holes are joined to the pillar reinforcement.

6. The front pillar lower structure according to claim 1, wherein the pillar reinforcement comprises a front pillar outer reinforcement and a hinge reinforcement joined to an inner side of the front pillar outer reinforcement, a side wall portion of the front pillar outer reinforcement is joined to an outer surface in the vehicle width direction of the rocker reinforcement, and a side wall portion of the hinge reinforcement extends downward so that a lower end portion of the side wall portion of the hinge reinforcement is interposed between the side wall portion of the front pillar outer reinforcement and the outer surface in the vehicle width direction of the rocker reinforcement.

7. The front pillar lower structure according to claim 1, wherein the joint reinforcing portion includes a rear wall joined to a rear surface of the pillar reinforcement and the front wall is joined to a front surface of the pillar reinforcement so that the pillar reinforcement is fitted between the front wall and the rear wall.

8. The front pillar lower structure according to claim 1, wherein a bracket joined to the pillar reinforcement above the joint reinforcing portion forms a closed cross section jointly with the pillar reinforcement.

9. The front pillar lower structure according to claim 1, wherein the rocker reinforcement is formed in a shape of an open cross section that is open inward in the vehicle width direction as seen from a vehicle front-rear direction and wherein a bulk is joined to an inner side of the open cross section.

* * * * *